Jan. 23, 1968   F. B. LUX ETAL   3,365,705
METHOD AND APPARATUS FOR RECORDING
PHASE-MODULATED CONTROL SIGNALS
Filed Feb. 8, 1965   4 Sheets-Sheet 3
FIG. 7
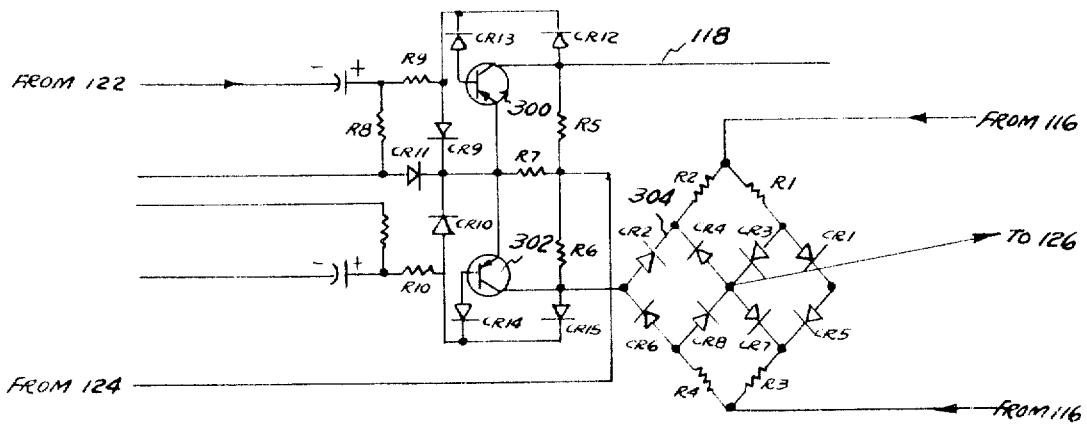
FIG. 6
LINE 250 
LINE 258 
LINE 260 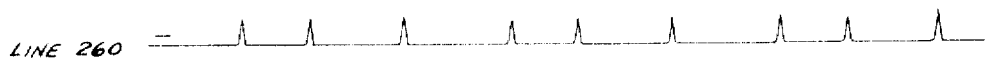
MV 276 OUTPUT 
ACTUAL 0° 
90° 
DESIRED 0° 
90° 
INVENTORS
ALLEN E. YOUNG
JOHN R. NAGY
FOSS B. LUX
BY *Allen M. Kross*
ATTORNEY United States Patent Office 3,365,705
Patented Jan. 23, 1968

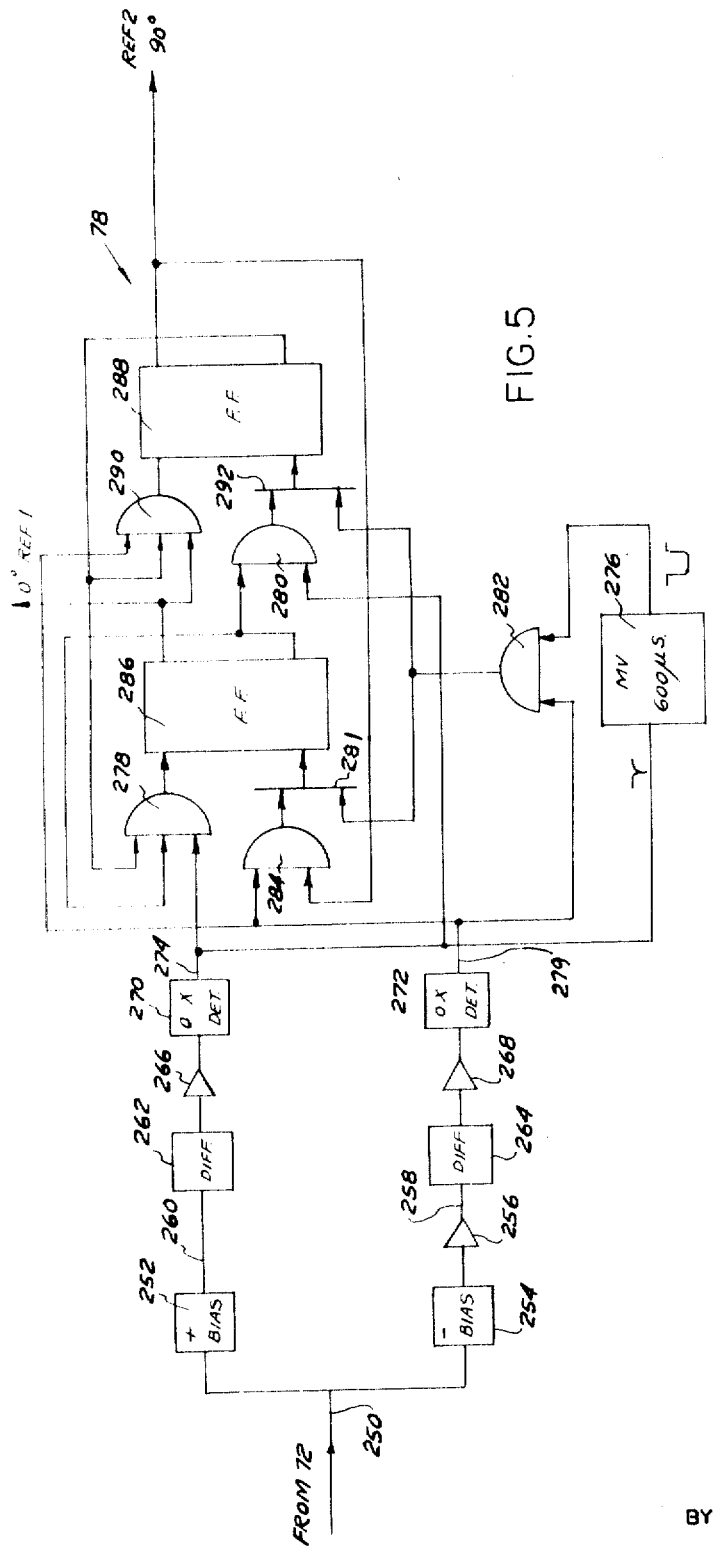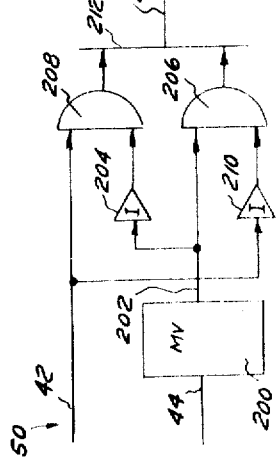

3,365,705
METHOD AND APPARATUS FOR RECORDING PHASE-MODULATED CONTROL SIGNALS
Foss B. Lux, Oak Park, John R. Nagy, Detroit, and Allen E. Young, Clawson, Mich., assignors to The Bendix Corporation, Detroit, Mich., a corporation of Delaware
Filed Feb. 8, 1965, Ser. No. 430,963
14 Claims. (Cl. 340—172.5)

ABSTRACT OF THE DISCLOSURE

A control system includes means for generating a reference square wave of constant frequency and a plurality of command square waves of the same frequency which are phase displaced with respect to the reference by an amount proportional to a desired control magnitude. Another square wave having a known phase displacement with respect to the reference, called a skew wave, is magnetically recorded along with the reference and command square waves. On play-back, control signals are developed in response to the phase displacement between each of the command square waves and the reference and a skew error signal is developed as a function of the phase displacement between the skew wave and the reference. This error signal is algebraically added to each of the control signals in order to correct them for skew errors introduced in the recording and play-back process.

---

This invention relates to a method of recording and playing back control signals and to apparatus for practicing that method, and more particularly to method and apparatus for magnetically recording and playing back phase-modulated control signals consisting of a control and a command signal recorded on separate tape channels.

A common method of encoding control signals, particularly employed in motion and position control systems, involves modulating the phase of a cyclical wave, such as a square wave or a sine wave, with respect to a reference waveform. The phase displacement of the command signal with respect to the reference signal at any instant is proportional to the instantaneous magnitude of the control signal. It is often desirable to record such signals for playback at a later time and/or a different location. This record-playback technique is often employed in connection with numerically controlled contouring position control systems. In such systems digital information relating to a desired path for the output member of the control system, such as the cutter of a machine tool, or numerical data relating to the shape of the desired part to be formed by a machine tool, is fed into either a general or a special purpose computer which operates on the data to provide control signals representative of instantaneous output member positions which may take the form of command square waves phase-modulated with respect to a reference square wave. These signals may be magnetically recorded for playback at the actual control unit. At the unit the control signals are decoded and used to control a servo system which directs the path of the output member.

In such systems the command and the reference signals are recorded on separate channels of a magnetic tape. One of the major sources of error in such systems results from the playback of the command and reference signals in some time relation which differs from that at which they were recorded. Since the two channels are separated from one another on the tape by some distance it is possible for error to be introduced in either their recording or playback, or both. For example, if the tape does not pass over the centerline of the playback head gap at a perfect 90° angle but is rather skewed from this normal path, one of the two signals will be retarded with respect to the other. Since the information in the signal is contained in the phase displacement of one wave with respect to the other this retardation will produce an error in the reproduced control signal. An effort may be made to minimize this skew error by providing a high degree of mechanical perfection in the recording and playback mechanisms, but even with a very high cost mechanical system some error may be introduced.

This error is particularly aggravated when low tape speeds are employed. Suppose the reference signal consists of a 200 cycle per second square wave, and in the control system one cycle of phase displacement between the command and the reference waves will result in a 0.2" movement of the output member. If a tape speed of 4" per second is employed, 1" of tape will contain 50 cycles of the reference and command waves; thus one cycle of signal covers 0.02" on the tape. If the maximum error of the entire system is to be 0.002" or 0.01 of a cycle, the maximum phase error that can be tolerated in the recording and playback processes only should be limited to approximately one-tenth of the total system tolerance, or approximately 0.001 cycle. This leads to a requirement for mechanical recording and playback tolerances of not more than 0.00002" equivalent tape track displacement or skew. It would be extremely difficult to provide a mechanism which could record and play back the signals with the accuracy.

The primary object of the present invention is to provide electronic means for detecting the error generated by recording and playback of phase-modulated control signals and to compensate the operation of the servo system in order to balance out this error.

The broad method of the invention is to record a supplementary signal on the tape (termed the "skew" signal) which has a known relation to one of the other signals. Preferably the skew signal takes the form of a square wave having a constant phase relationship with a reference square wave. The skew signal is preferably recorded on a channel on one edge of the tape while the reference square wave is recorded on the channel at the opposite edge. At the playback unit the phase displacement between the reference and the skew signals is detected and if this phase displacement differs from their recording displacement an error signal having a magnitude proportional to the difference is generated. The error signal preferably takes the form of a voltage proportional to the recording displacement error and it may be summed directly with the voltage generated as a function of the phase difference between the command and reference signals as developed by the resolver of the servo system.

Another problem associated with the recording of phase-modulated control signals involves the necessary form of the reference signal at the control end. Resolvers are normally employed as feedback elements in the control servo loop. They are energized by the reference signal and the phase of their output signal is compared with the command signal in order to develop an error signal for the servomotor. The resolvers must be energized by two waves 90° out of phase. It is possible to develop these two waves from the single reference signal at the control end, but because of the instability of the frequency of the played back reference wave due to recording and playback inaccuracies this approach is a difficult one. The present invention solves this problem by recording a reference signal which contains composite elements of both the 0° and 90° wave trains. Since this signal is recorded on a single channel, no skew problem is encountered in its playback.

In the preferred embodiment the composite signal takes the form of the basic 0° square waveform with cross over points of the 90° waveform superimposed thereon as shorter pulses. This composite signal is developed at the recording end by employing a reference counter which generates the 0° square wave plus marker pulses indicating the crossover points of the 90° waveform. A waveformer superimposes the pulses on the square wave to provide the composite wave. The 90° marker pulses are also fed to a flip-flop to generate a squarewave which represents the skew channel signal.

At the playback end, this composite signal is decoded into the 0° and 90° waves by a unique time discriminator circuit which employs time delays to distinguish the sharp waveforms of the 90° marker signals and the widely separated pulses that represent the 0° waveform.

In the preferred embodiment, all signals are recorded as saturation levels so that the crossing information may be decoded at the playback end and reformed into the original waves without concern about the inaccuracies of the recording and playback system.

Provision may be made for the transmission of auxiliary command signals, either on additional tape channels or employing multiplexing techniques similar to that used to accommodate both the 0° and 90° waveforms on a single channel.

It is therefore seen to be a primary object of the present invention to record a supplementary skew signal on a magnetic tape having phase-displaced command and reference signals recorded thereon, such skew signal having a known phase displacement with respect to one of the signals and then comparing the phase displacement between the skew signal and its companion signal as produced by the playback unit in order to detect any errors resulting from skewing of the recording or playback mechanisms. A further object is to use such error signals to correct the action of this servo by balancing out such error.

Another object is to provide such a system wherein the supplementary signal bears a known phase displacement with respect to the reference signal and the means for detecting the error of the two constitutes a detector keyed by the two signals.

A further object of the present invention is to provide a numerically controlled phase-analog servo system employing a recording link wherein a pair of phase-displaced reference signals, which are required for the energization of a resolver, are both generated at the recording end and are recorded on a single channel as a composite signal, and wherein means are provided at the playback end to regenerate both of the phase-displaced reference signals for use with the resolver.

Another object is to provide such a system wherein the composite signal consists of one basic square wave with the crossover points of the other square wave superimposed thereon in the form of short pulses in a saturation direction opposite that of the full wave.

Other objects, advantages, and applications of the present invention will be made apparent by the following detailed description of the preferred embodiment to the invention. The description makes reference to the accompanying drawings in which:

FIGURE 1A illustrates the output of the composite wave former;

FIGURE 3 is a block diagram of a composite waveformer employed in the recording section of FIGURE 1;

FIGURE 4 illustrates the waveforms associated with particular points in the unit of FIGURE 3;

FIGURE 5 is a block diagram of the wave regenerator employed in the playback section of FIGURE 2;

FIGURE 6 illustrates the waveforms associated with particular points in the unit of FIGURE 5; and FIGURE 7 is a schematic diagram of a keyer-detector used with the present invention.

Figure 1:
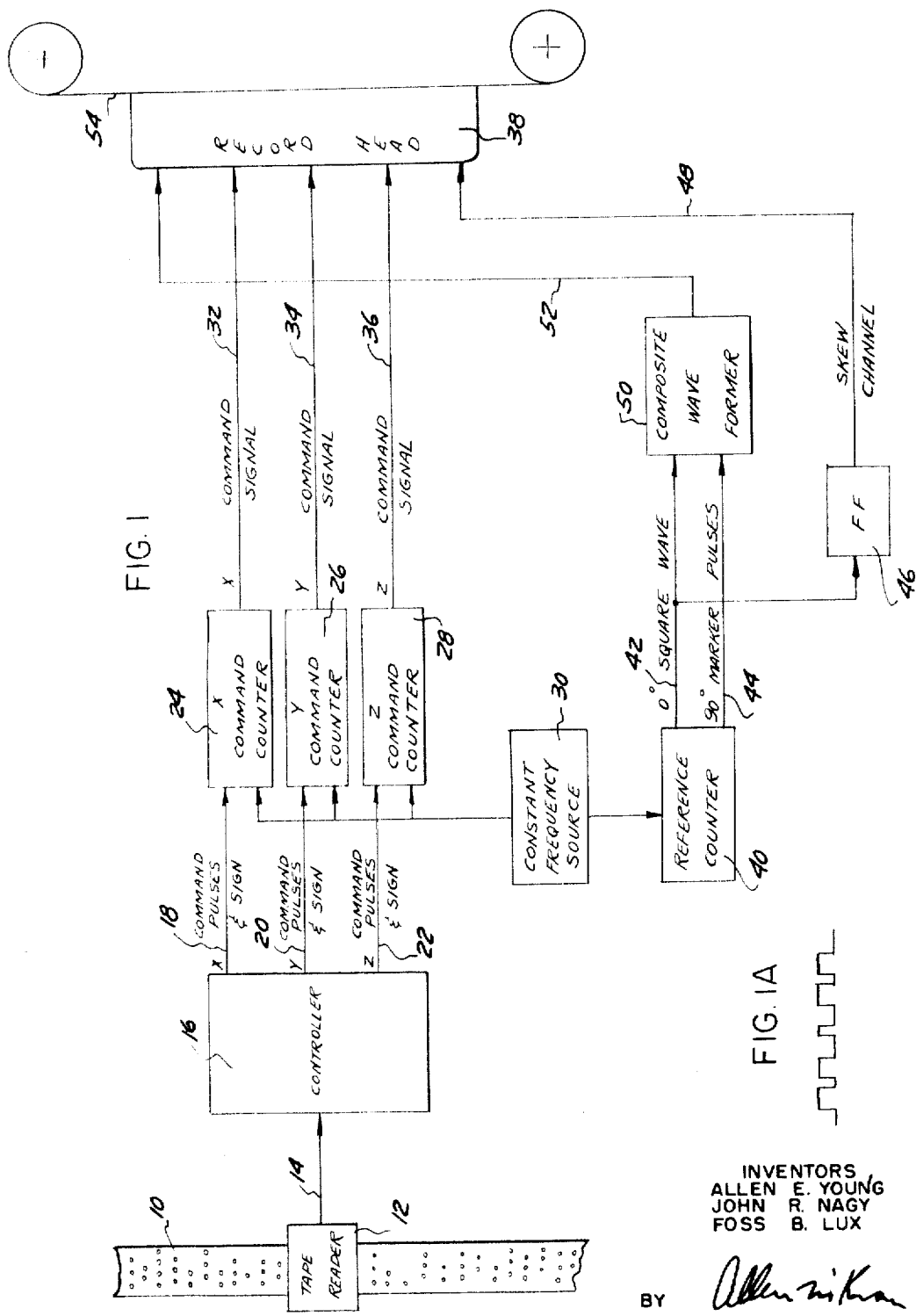
FIGURE 1 is a block diagram of the recording section of a phase-analog control system embodying the present invention.
Figure 2:
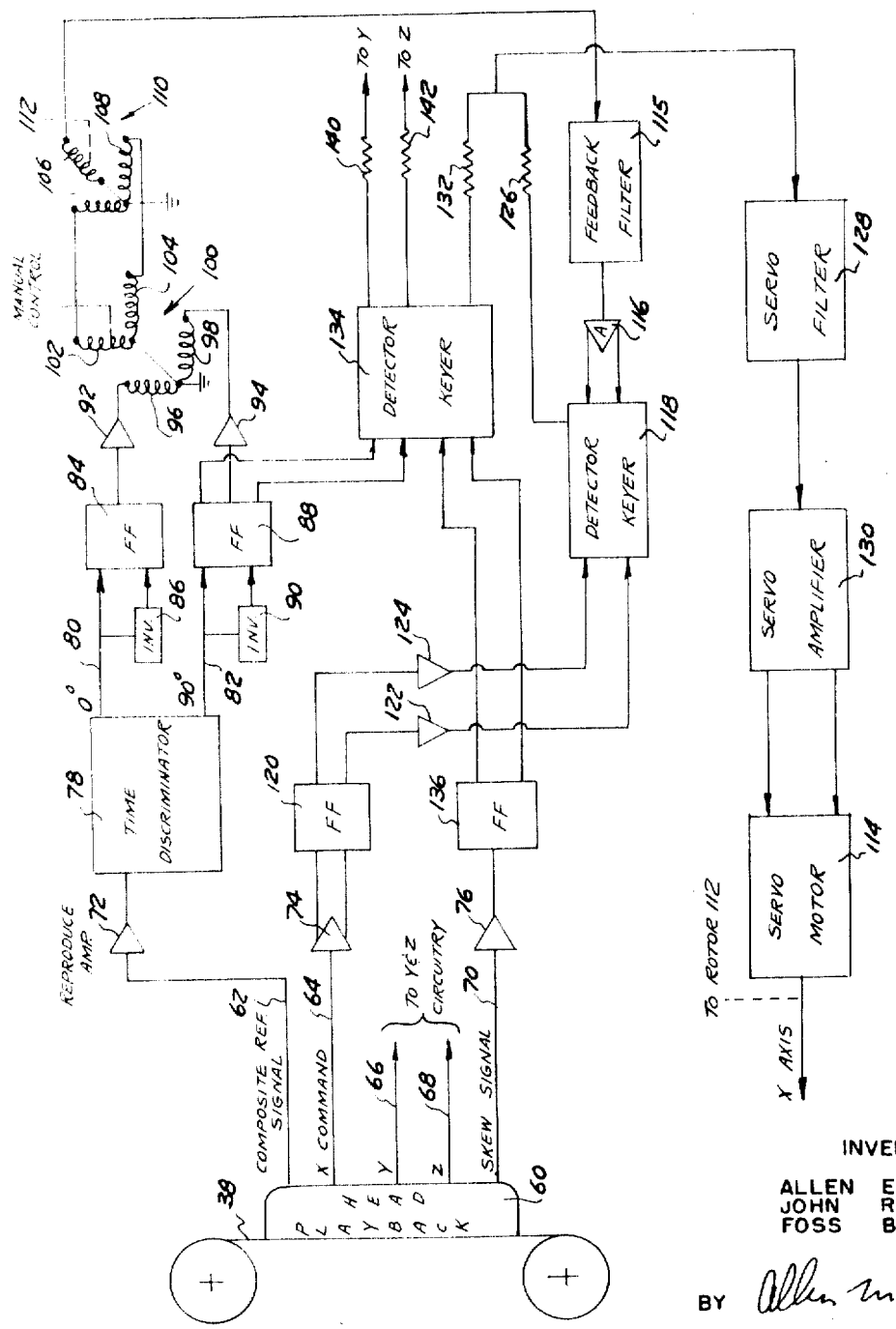
FIGURE 2 is a block diagram of the playback section of a phase-analog control system embodying the invention.

Referring to the block diagrams of FIGURES 1 and 2, in the preferred embodiment of the invention the information relating to the desired motion path of an output member is coded in a digital form on a punched tape 10 which is passed through a tape reader 12 to generate a series of electrical signals representative of the coded information. These signals are transmitted on line 14 to a controller 16. The controller may be of the type disclosed in U.S. Patent No. 3,002,115. It is operative to generate a group of pulse trains, each of which is operative to control one axis of motion of the output member. In the preferred embodiment, the output member is to be driven along three mutually perpendicular axes and the controller 16 provides output or command pulse trains on lines 18, 20 and 22. In addition to the command pulse trains, these lines carry information relating to the sign of motion of the output member along each of the axes. The three command pulse train channels 18, 20 and 22 are respectively connected to X, Y and Z command counters 24, 26 and 28. These command counters may be of the general type disclosed in U.S. Patent No. 3,011,110. Each has an additional input from a constant frequency pulse generator 30. The command counters provide output pulse trains having pulse rates which are an integral divisor of the frequency of the source 30. The pulses in each of these trains are phase-displaced with respect to a reference by an amount, and in a direction which is proportional to the number and sign of the pulses they receive on the lines 18, 20 and 22 from the controller 16. These phase-displaced command signals are provided on lines 32, 34 and 36 to a recording head 38.

The constant frequency pulse generator 30 also acts as an input to a reference counter 40 which divides this input pulse train by the same divisor employed in the command counters 24, 26 and 28. Its output is provided on two lines. The line 42 carries a basic reference square wave of the same frequency as the command signals on lines 32, 34 and 36. This "0 degree" square wave has not been phase-shifted in the manner of the command signals, and accordingly, it acts as a reference signal, useful in determining the degree of phase shift of the command signals.

The reference counter 40 also provides an output on line 44 consisting of a square wave derived from the next to last dividing stage of the counter and thus having a frequency twice that of the "0 degree" square wave. The wave on line 42 is fed to a flip-flop 46 which generated the square wave having a 0° relationship with respect to the last stage of the reference counter 40. This square wave is transmitted to the record head 38 on line 48 and is recorded on the tape as the skew channel which is useful in eliminating playback error as will be subsequently described.

The square waves on lines 42 and 44 are fed to a composite waveformer 50 which operates in a manner which will be subsequently described to form the composite output wave illustrated in FIGURE 1A. This wave consists of the "0 degree" square wave, with short duration pulses superimposed thereon in the center of each square wave. This composite wave is provided on line 52 to the record head 38.

The record head acts to magnetically record the information on the tape, schematically indicated at 54. The tape and its record head may be of a relatively low cost "entertainment" type as the corrective action controlled by the skew channel acts to eliminate its inaccuracies. The position of the inputs to record head 38 are intended to schematically represent placement of the various signals across the width of the tape. It is preferable that the skew channel on line 48 and the reference wave (or the composite wave containing the reference signal) are recorded on opposite edges of the tape, so that any skew in the playback of the tape will produce the maximum deviation between these signals. The command signals on lines 32, 34 and 36 are preferably recorded on the intermediate channels of the tape.

The tape may be played back at a later time to provide appropriate control signals for the control of the output member through the circuitry of FIGURE 2. The control signals are derived from a playback head 60. The outputs of the playback head take the form of pulses occurring at the axis crossings of the square waves and marker pulses recorded by the circuitry of FIGURE 1. The composite reference signal is provided on a line 62, the X, Y and Z command signals on lines 64, 66 and 68 respectively and the skew signal on line 70. The diagram of FIGURE 2 illustrates the control for a single axis. The specific Y and Z circuitry is identical to that shown for the X axis and is not disclosed. Each of the signals 62, 64 and 70 are fed to one of a series of reproduce amplifiers 72, 74 and 76 respectively.

The amplified output of the reproduce amplifier 72, which has the composite reference signal on line 62 as its input, is then fed to a time discriminator 78. This discriminator acts in a manner which will subsequently be described in detail to generate a pair of pulse trains; one, on line 80, representing the crossover points of the 0 degree square wave, and the other, on line 82, representing the crossover points of the 90° square wave.

Line 80 is fed to one of the inputs of a flip-flop 84 directly and to the other input of that flip-flop through an inverter circuit 86. Flip-flop 84 thus has as its output a square wave having a zero reference phase with respect to the two command signals. Line 82 is fed directly to one of the terminals of a second flip-flop 88 and to the other terminal of that flip-flop through an inverter circuit 90. Flip-flop 88 thus has as its output a square wave having a 90° reference phase with respect to the command waves.

The outputs of the flip-flops 84 and 88 are fed through a pair of amplifiers 92 and 94 to the two stator coils 96 and 98 of a manual positioning resolver generally indicated at 100. The rotor of this resolver may be manually adjusted to control the position of the output member. The rotor coils 102 and 104 of the manual position control 100 are connected to the stator coils 106 and 108 of the actual feedback resolver, generally indicated as 110. The rotor 112 of the resolver 110 is driven by the servo motor 114 which positions a driven member along the X axis. Since the stator of the resolver 100 and in turn the stator of the resolver 110 are energized with a square wave, the outputs of their rotors will constitute signals in which the frequency of the square wave predominates. Therefore, the rotor 112 is fed to a feedback filter 115 which passes only the fundamental frequency of the square waves.

The output of this filter is fed to an amplifier 116 and then to a detector-keyer 118. The detector-keyer has as its other input the X command square wave as generated by a flip-flop 120 from amplifier 74. The square wave output of the flip-flop 120 is passed through two amplifiers 122 and 124 and then to the detector-keyer. The detector-keyer 118 compares the phases of its two input signals and provides an output signal constituting a voltage having a magnitude proportional to the deviation of the phase difference from an ideal 90°. Since its input signal from the amplifier 116 represents the actual position of the output member along the X axis as a function of the phase of the reference signal and the input from the amplifiers 112 and 124 constitute the desired X position as represented by the X command signal, the output of the detector-keyer 118 constitutes a voltage representing the error between the actual and command signals.

This voltage is fed through a summing resistor 126 to a servo filter 128 and then a servo amplifier 130. Servo amplifier 130 drives the servo motor 114 which positions the output member along the X axis and drives the rotor 112 of the resolver 108. The voltage applied to the servo filter 128 represents the sum of the voltage across the resistor 126 and a voltage applied to resistor 132, which is a function of the skewing correction factor. This factor is derived from a second-detector-keyer 134. This detector-keyer has one input from a flip-flop 136 which receives the amplified output of the skew signal, and a second input from the flip-flop 88 which represents the 90° reference signal. Since the skew signal is originally derived from the 0° square wave on line 42 of the recording section, the input to the detector-keyer 134 from flip-flop 88 is 90° out of phase with the input from the flip-flop 136 if the tape is played back without any skew. The detector-keyer 134 compares the phase of its two input signals and generates an output signal to the resistor 132 constituting a square wave having a zero average value when its two input signals are 90° out of phase and increasing in average value as the phase difference deviates from 90° ideal. It should be understood that in other embodiments of the system the skew correction error might be introduced at a different point. For example, it might be summed with the command signal rather than the error signal by using it to drive an instrument servo which controls the position of the rotor of a resolver such as 100.

Certain of the circuits employed in this preferred embodiment are novel and unique and the following material will describe them in greater detail.

Composite wave-former

The composite waveformer 50 is operative to receive zero-degree square waves and a double frequency square wave from the reference counter 40 and to generate a waveform of the type shown in FIGURE 1A and wherein marker pulses are superimposed upon the 0° square wave. Referring to FIGURES 3 and 4, line 42 is derived from the last stage of the reference counter 40. Line 44 is derived from the next to last stage of the reference counter. Accordingly, the signal on line 44 is the square wave having twice the frequency of the square wave on line 42. The signal on line 44 is provided to a one-shot multivibrator 200 which emits a short duration output pulse each time the square wave on line 44 changes from its higher voltage state to its lower voltage state. These output pulses are generated on line 202, and are fed to an inverter 204 and into an "and" gate 206. The inverter 204 feeds a second "and" gate 208 which has the signal on line 42 as its other input. The signal on line 42 is also fed to a second inverter 210 which provides the second input to the "and" gate 206. The output of the two "and" gates 206 and 208 are summed in an "or" gate 212 which provides the necessary operative line 52. The "and" gates and inverters act to sum the relatively short pulses generated by the multivibrators 200 and the longer square waves to form this composite signal which appears on line 52.

Time discriminator

The time discriminator 78 which regenerates the zero-degree and the 90° square waves from the composite reference signal, is disclosed in detail in FIGURE 5. It receives the amplified composite reference signal from the reproduce amplifier 72. This signal on line 250 takes the form indicated in FIGURE 6 as the playback head simply produces a pulse each time the recorded magnetic intensity changes sign. These pulses are introduced to a pair of biased amplifiers 252 and 254. The amplifier 252 is biased so as to only respond to positive pulses while the amplifier 254 is biased so as to respond to negative pulses. The negative pulses from the amplifier 254 are inverted by unit 256 to produce the pulses on the line 258 while the output of the amplifier 252 is indicated on line 260. Each of these pulse trains is then differentiated by the units 262 and 264, respectively amplified by units 266 and 268 and then fed through zero-crossing detectors 270 and 272. The zero-crossing detectors contain circuitry which generates sharper pulses at the exact peak of the original pulse, as indicated by the zero-crossing point of the differentiated pulses. These shaping techniques make the system independent of the played back pulse shape.

The outputs of the zero-crossing detectors 270 and 272 are then applied to a network which regenerates the 90° and zero-degree square waves. The output of the zero-crossing detector 270 at line 274 is fed to a one shot multivibrator 276 as well as to a first "and" gate 278 and a second "and" gate 280. The multivibrator 276 emits a square output pulse having a duration slightly greater than the output pulse produced by the one shot multivibrator 200 in the composite waveformer circuit but shorter than the time interval between any part of the pulse generator by the multivibrator 200 and the leading or trailing edges of the zero-degree square wave on line 42. The multivibrator 276 thus generates a time reference signal which is used by the other circuitry of the time discriminator to distinguish between the 90° pulses and the zero-degree pulses.

The output of the zero-crossing detector 272 is applied on line 279 to a third "and" gate 282 and a fourth "and" gate 284. The other input to the "and" gate 282 is conditioned by the pulse output of the multivibrator 276. The circuit includes two flip-flops 286 and 288. The "set" or upper input of the flip-flop 286 is conditioned by the output of the "and" gate 278 and its "reset" input or lower input by the "or" gate 281. The "or" gate 281 is in turn conditioned by the output of the "and" gate 282 and the "and" gate 284. The other conditioning inputs to the "and" gate 278 are provided by the "reset" output of flip-flop 286 and the "reset" output of the flip-flop 288. The other conditioning input to the "and" gate 284 is provided by the "set" output of the flip-flop 288, which output also represents the 90° square wave. The "set" input of the flip-flop 288 is provided by the output of a fifth "and" gate 290. This "and" gate is conditioned by the input on line 279 from the zero-crossing detector 272, by the "reset" output of the flip-flop 288 and by the "set" output of the flip-flop 286. This "set" output of the flip-flop 286 also constitutes the zero-degree square wave. The "reset" input of the flip-flop 288 is conditioned by the output of an "and" gate 292. This "and" gate has one input from the output of the "and" gate 282 and another input from the output of the "and" gate 280. The "and" gate 280 is in turn conditioned by the "reset" output of the flip-flop 286 as well as the output of the zero-crossing detector 270 on line 274.

FIGURE 6 illustrates the actual and desired outputs of the time discriminator as a function of time. The broad action of the circuit is to initiate a 90° square wave upon the occurrence of the first of the two pulses which occur within the interval of one of the multivibrator pulses and to terminate the 90° square wave upon the occurrence of the next series of two pulses which occur within the time interval of the multivibrator; also the circuit generates the zero-degree square wave by selecting those pulses which are separated from all the other pulses by a time period which exceeds that of the multivibrator pulse. As may be seen by comparison of the actual and the desired output waves, it may require several cycles for the circuit to produce the required waves when starting from random circuit initial conditions, or in the presence of noise or missing pulses. This does not affect the operation of the device as synchronism is always restored in a short time as compared to that time to which the actual controlled output member servos are capable of responding.

*Detector-keyer*

The two detector-keyers 118 and 134 are identical. The circuitry of the detector-keyer 118 is disclosed in FIGURE 7. Essentially, the keyer consists of a pair of transistors 300 and 302 connected in a switching arrangement and controlled by the X command square wave. The transistors switch a diode bridge which has the filtered and amplified rotor signal as its input. If the phase of the command square wave is shifted by 90° with respect to the rotor output, the detector-keyer will provide a symmetrical square wave voltage output which has a zero DC value. The servo filter 128 generates its average value and provides it to servo amplifier 130. If some other phase relationship exists between the command square wave and the rotor square wave, a symmetrical wave will be produced which has a DC average value which is a function of the phase displacement.

The transistor 300 essentially amplifies the signal from amplifier 122 and the transistor 302 amplifies the input in amplifier 124. Each amplifier is driven between cutoff and full conduction by its input. The resultant square waves are applied to the diode switching circuit generally indicated at 304. When the key voltage is in one direction, it essentially connects one of the rotor lines to the output line 126, and when the voltage is in the opposite direction, it connects the opposite one. The resultant square wave is applied to resistor 126.

Having thus described our invention, we claim:

1. In a control system including means for generating a reference signal and a command signal having a phase displacement with respect to said reference signal which displacement is a function of the desired control magnitude, means for recording said reference and command signals, means for playing back said reference and command signals, and means for generating a control signal from said played back reference and command signals, the improvement which comprises: means for generating a third signal having a known phase displacement with respect to said command signal; means for recording said third signal; means for playing back said third signal; means for detecting variations from the known phase displacement between said played back third signal and said played back command signal and for generating a modification signal having a property proportional to said variations; and means for modifying said control signal in accordance with said variation by summing said control signal with said modification signal.

2. In a control system which includes means for generating a reference signal and a command signal having an instantaneous phase displacement with respect to said reference signal which is proportional to a desired control magnitude, means for recording said reference and command signals, means for playing back said reference and command signals, and means for generating a control signal from said played back reference and command signals, the improvement which comprises: means for generating a third, skew signal which has a known and constant phased isplacement with respect to said reference signal; means for recording said skew signal along with said reference and command signals; means for playing back said skew signal along with said reference and command signals; means for detecting variation from the ideal phase relationship between said skew signal and said reference signal as played back and generating a modification signal having a property proportional to said variations; and means for modifying said control signal as a function of said variation by summing said modification signal with control signal.

3. In a control system, in combination: means for generating a first reference signal; means for generating a command signal having an instantaneous phase displacement with respect to said reference signal which is a function of a desired control magnitude; means for generating a skew signal having a known phase displacement with respect to said reference signal; a magnetic recording device operative to record said reference, command and skew signals on a magnetic medium; a magnetic playback unit operative to regenerate said reference, command and skew signals from said magnetic medium; means for generating a control system as a function of the played back phase displacement between the said reference and command signals; means for generating a skew correction signal as a function of the variation of the played back reference and skew signals from their known relation; and means for summing said control signal with said skew correction signal.

4. The control system of claim 3 wherein said magnetic medium constitutes a magnetizable tape and said reference and skew signals are recorded on the extreme channels of said tape.

5. A control system comprising: means for generating a reference square wave; means for generating a command square wave having an instantaneous phase displacement with respect to said reference square wave which is a function of a desired controlled magnitude; means for generating a skew signal which constitutes a square wave having a known and constant phase displacement with respect to said reference signal; a magnetic type recording unit for recording said reference, command and skew square waves on a tape with the reference and skew square waves at extreme positions along the width of said tape; a magnetic tape playback unit for generating electrical signals having characteristics of said reference, command, and skew square waves; means for detecting phase displacement between the signals having the characteristics of the reference and command square waves and generating a control signal having a magnitude which is a function of said difference; means for comparing the phase displacement of the signals which have the characteristics of the reference and skew signals and for generating an electrical signal having a magnitude which is a function of their variation from the known relationship; and means for modifying said control signal with said skew correction signal.

6. In a control system, in combination: a source of numerical information; means for generating a reference square wave; means for generating a command square wave having an instantaneous phase displacement with respect to said reference square wave which is a function of the numerical information; mean for generating a skew square wave having a known and constant phase displacement with respect to said reference square wave; means for recording said reference, command and skew square waves; means for playing back said reference, command and skew square waves; means for comparing the phase relation of said played back reference and command square waves; means for comparing said played back reference and skew square waves to generate a skew correction signal which has an instantaneous magnitude which is a function of the variation in the phase relationship between said played back skew and reference signals from their known relationship; means for modifying said control signal with said skew correction signal; and servo-mechanism means operative to receive said modified control signal and to move an output device as a function of said control signal.

7. A control system comprising: means for generating a reference square wave; means for generating a command square wave having an instantaneous phase displacement with respect to said reference square wave which is a function of a desired controlled magnitude; means for generating a skew signal having a known and constant phase displacement with respect to said reference signal; a magnetic medium; means for recording said reference, command, and skew signals on said magnetic medium; means for playing back said reference, command and skew signals from said magnetic medium; a resolver, a load; a servo motor operative to drive the load and the rotor of the resolver; means for energizing said resolver from the signal derived from said played back reference wave; means for comparing the phase displacement of the output of the resolver with the played back command square wave and for generating a control signal for said servo motor as a function of their instantaneous phase displacement; and means for comparing said played back skew signal and said played back reference signal; means for generating a skew correction signal having an instantaneous magnitude which is a function of the deviation of the played back reference and skew signals from their known relationship; means for modifying said control signal with said skew correction signal.

8. A control system, comprising: means for generating a first reference square wave and a second reference square wave displaced with respect to said first square wave by 90°; a composite waveformer operative to receive said first and second square waves and to generate a composite reference signal having components of said first and second square waves; means for generating a command square wave having a phase displacement with respect to said reference square waves which is an instantaneous function of a desired control magnitude; means for generating a skew square wave having a known and constant phase displacement with respect to said reference square waves; a magnetic medium; means for recording said composite reference signal, said command signal and said skew signal on said magnetic medium; means for playing back said composite reference signal, said command signal and said skew signal from said magnetic medium; means for reconstituting said first and second reference square waves from said composite reference signal; a resolver; means for energizing the resolver from said reconstituted first and second reference square waves; a servo-motor; means for comparing the phase of the output of the resolver with the played back command wave; means for generating a control signal for said servo-motor as a function of the phase displacement between the output of the resolver and said played back command signals; means for comparing said playback skew signal with one of said reconstituted reference signals in order to generate a skew correction signal having an instantaneous magnitude proportional to the variation of the phase displacement of said compared reference and skew signals from their known relationship; and means for modifying said servo-control signal as a function of said skew correction signal.

9. In a control system, in combination: means for generating a first reference square wave; means for generating a second reference square wave having a 90° phase displacement with respect to said first reference square wave; means for generating a command signal having an instantaneous phase displacement with respect to said reference waves which is a function of a desired controlled magnitude; means for combining said first and second reference waves to form a composite reference signal having characteristics of said first and second reference waves, means for recording said composite reference signal and said command square wave; means for playing back said composite reference signal and said command square wave; means for operating upon the played back composite reference signal to regenerate said first and said second square waves; a servo-motor; and means for comparing the phase displacement of the output signal from the resolver with said played back command signal and for generating a control signal having a magnitude proportional to their difference.

10. A control system comprising: a constant frequency source; a counter energized from said source; a composite waveformer operative to receive the signals generated by the last two stages of said counter and to generate a composite reference signal therefrom; means for generating a command square wave having a phase displacement with respect to said composite reference square wave which is a function of a desired instantaneous control magnitude; means for recording said composite reference wave and said command square wave; means for playing back said composite reference wave and said command wave; means for operating upon said played back composite reference wave to generate two square waves having a 90° phase relationship with respect to one another; a resolver having at least one pair of windings displaced by 90° with respect to one another energized by said two 90° square waves; means for comparing the phase displacement between the output of said resolver and the played back command square wave; a servo-motor; and means for energizing said servo-motor with a signal generated by said means for comparing the output of the resolver and the command square wave.

11. The structure of claim 10 wherein the composite reference signal constitutes the square wave generated by the last stage of the counter with shorter marker pulses superimposed at points mid-way in each cycle of the square wave.

12. The structure of claim 10 wherein the composite reference wave constitutes the square wave generated by the last stage of the counter with the shorter marker pulses inserted mid-way in each cycle of the square wave and the means for generating a pair of square waves displaced 90° from one another from said played back composite reference wave including a timing device operative to generate a signal having a duration shorter than that of one cycle of the square wave and greater than that of the superimposed marker pulses.

13. A control system, comprising: means for generating a plurality of control signals; means for combining at least two of the signals into a single composite signal; a magnetic medium; means for recording the composite signal and the other control signals on the magnetic medium; means for playing back the composite signal and the other control signals from said magnetic medium; and means for reconstituting the original command signals from said composite signal and said played back control signals.

14. A system for generating a pair of square waves displaced 90° with respect to one another, comprising: means for generating a constant frequency square wave; a counter operative to receive said square wave; a composite waveformer operative to receive the output of the last two stages of said counter and to generate a composite signal including the square wave constituting the last stage of the counter with superimposed short marker pulses disposed mid-way in each cycle of such last stage square wave; means for recording said composite wave; means for playing back said composite wave; and means operative to receive said played back composite wave and to regenerate two square waves having a 90° phase relationship with respect to one another, said reconstituting means including a one-shot multivibrator operative to generate a pulse having a time period less than that of one cycle of said square wave and more than that of a marker pulse.

References Cited

UNITED STATES PATENTS

| | | | |
|---|---|---|---|
| 2,842,756 | 7/1958 | Johnson | 340—174 |
| 2,937,239 | 5/1960 | Garber et al. | 179—100.2 |

ROBERT C. BAILEY, *Primary Examiner.*

PAUL J. HENON, *Examiner.*

R. M. RICKERT, *Assistant Examiner.*